United States Patent Office 3,410,755
Patented Nov. 12, 1968

3,410,755
PROCESS AND MEDIA FOR PRODUCING CELLS OF LACTIC ACID BACTERIA
John L. Etchells, Raleigh, N.C., and Ralph N. Costilow, Okemos, Mich., assignors to the United States of America as represented by the Secretary of Agriculture
No Drawing. Filed Oct. 7, 1965, Ser. No. 493,937
5 Claims. (Cl. 195—96)

ABSTRACT OF THE DISCLOSURE

This invention relates to some highly selective culture media for micro-organisms which permit the isolation and production on a commercial scale, of particular strains of lactic acid producing bacteria. Control of pH, surprisingly different in the case of agar and of broth media, is critical for the preparation of the media.

A non-exclusive, irrevocable, royalty-free license in the invention herein described, throughout the world for all purposes of the United States Government, with the power to grant sublicenses for such purposes, is hereby granted to the Government of the United States of America.

This invention relates to media for producing cells of lactic acid bacteria. More specifically, it relates to a medium for promoting the rapid and luxuriant growth of bacteria capable of producing lactic acid in saline solutions under acid conditions. Still more specifically, it deals with a process for selectively isolating and producing large quantities of desirable lactic acid bacteria useful in the commercial production of brined vegetables.

In the copending application of Etchells, Bell and Costilow, Ser. No. 672,722, filed Oct. 4, 1967, which is a continuation-in-part of application bearing Ser. No. 324,898, filed Nov. 19, 1963, now abandoned there is disclosed and claimed a process for the Pure Culture Fermentation Process for Cucumber Pickles employing as an inoculum a lactic acid fermentation inducing micro-organism selected from the group consisting of the genera Lactobacillus, Pediococcus, and Leuconostoc. These bacteria may be in the form of either dried pellets, dried granules, dried powder or broth form.

Not all the species of these three genera produce satisfactory fermentation. Even different strains of the same species may cause undesirable fermentation differences. For example, a decided difference in color and odor of brine-stock was obatined with certain strains of the species *Pediococcus cerevisiae*. Some gave the brine a stale hay-like odor and the pickles revealed an off-color, with evidence of bleaching. As the result of the above important findings, screening tests involving several hundred pure culture fermentations were carried out using over 50 individual cultures of lactic acid bacteria representing 10 species in the three genera, namely: *Lactobacillus bulgaricus, L. Brevis, L. delbrueckii, L. fermenti, L. helveticus, L. lactis, L. plantarum, L. thermophilus; Pediococcus cerevisiae;* and *Leuconostoc mesenteroides*.

It became necessary, therefore, to separate the species of a genus and, in many cases, the different strains of a species. After the species, or strains, had been separated, it was then necessary to produce *rapidly* large quantities of the desired species, or strains, for commercial use. Therefore, two problems were involved. The first problem was to determine which genera, or which species of a genus, or which strains of a species produced the required, desirable fermentation results. The second problem involved the development of a selective isolation medium (SIM) for the selective isolation of the strains, species, and genera; it also involved the development of a growth medium (GM) for the production of these selected micro-organisms in commercial quantities. The solution to the first problem has been disclosed and claimed in the above-cited copending application, Ser. No. 324,898, filed Nov. 19, 1963. The present invention deals with the second problem. Although the pure cultures of the present invention were uesd in the above copending application, either the media nor the procedure for isolating the desired bacteria and producing them in commercial quantities was described and claimed. Ability to promote commercial growth is *critical*.

Accordingly, it is a prime object of the present invention to develop a medium for promoting the rapid and luxuriant growth of *desirable* bacteria capable of producing lactic acid in saline solutions. These *desirable* bacteria may be defined as those of the three genera and 10 species listed above. These lactic acid fermentation inducing micro-organisms should be usable in the form of either dried pellets, dried granules, dried powder or broth.

Another object of this invention is to develop a process (sometimes referred to as method) for producing large quantities of these desirable lactic acid bacteria useful in the production of brined vegetables wherein the brine-stock may have a salt content of about 3.0 to 8.0 weight percent salt. The lactic acid micro-organisms so produced should be capable of growing (or multiplying) in brine-stocks having a pH of about 4.6 to 4.2 resulting from the addition of food-grade, edible lactic, citric, or acetic acid. One or more of these acids may be incorporated into the brine-stock to retard, or completely inhibit the growth of any spore-forming types of bacteria that might be present in the raw vegetables prior to fermentation.

It is a still further object of the present invention to selectively isolate colonies of the desirable, lactic acid bacteria for inoculation of the novel medium of our invention. Other objects will be apparent to those skilled in the art.

In the past tomato juice has been widely used as a medium for the selective isolation of lactobacilli. However, it has the disadvantage that molds, streptococci, and "spreading organisms" also grow on, and in, this medium and there is considerable danger of contamination of the lactobacilli. The pH of tomato juice is about 6.1.

Another medium developed by Rogosa, Mitchell and Wiseman (J. Bacteriol. 62, 132 (1951)) for the selective isolation of lactobacilli consists essentially of the following:

| | Grams |
|---|---|
| Trypticase | 10.0 |
| Yeast extract | 5.0 |
| Monopotassium phosphate | 6.0 |
| Ammonium citrate | 2.0 |
| Dextrose | 20.0 |
| Sorbitan mono-oleate | 1.0 |
| Sodium acetate hydrate | 25.0 |
| Magnesium sulphate | 0.575 |
| Manganese sulphate | 0.120 |
| Ferrous sulphate | 0.034 |
| Agar | 15.0 |
| Total (dry) | 84.709 |

Addition of 84.709 grams of the dry material to a liter of distilled water, mixing, addition of 1.32 ml. acetic acid, boiling about two minutes and cooling to at least 45° C. produces a medium useful for plate counts. According to Rogosa et al., the above medium gave results similar to tomato juice agar, and has a pH of 5.4.

Quite surprisingly, the Rogosa medium proved to be inhibitory for the growth of the desirable *Leuconostic mesenteroides*; and some desirable strains of *Pediococcus cerevisiae* and *Lactobacillus plantarum*. However, when the pH was changed to 5.6±0.05, this inhibition was reversed and the modified medium retained a high degree of selectivity. *This was unexpected.* Further, it was discovered that by the addition of about 0.0075% by weight of a brom cresol green dye (to aid colony counting), this novel medium could be successfully used for separating relatively low populations of the desirable lactic acid bacteria occurring on the fresh vegetables, i.e., pickling cucumbers, from exceedingly high populations of other microbial groups. Most important, the colonies of the desirable species of lactic acid bacteria were unusually large when compared with colonies of the same lactic acid bacteria occurring on other media known to those skilled in the art. These large colonies could readily be separated from the modified medium and developed into stock cultures using TSA stabs (Trypticase Sugar Agar) by conventional processes.

Medium for production of cells of desirable lactobacilli

Following the development of a suitable medium for the selective isolation of individual species, and even strains of the species, the problem of finding a medium for promoting the rapid and luxuriant growth of these desirable, fastidious facteria became *critical*. Various broths known to those skilled in the art were tried and either inhibited the growth of the micro-organism, or slowed down the growth, or were deficient in some other property.

It was then discovered that an aqueous broth having a special composition and a special pH promoted the rapid and luxuriant growth of many species of Lactobacillus. The composition of this novel medium follows:

| | Grams |
|---|---|
| Trypticase | 10.0 |
| Yeast extract | 5.0 |
| Monopotassium phosphate | 6.0 |
| Ammonium citrate | 2.0 |
| Dextrose | 20.0 |
| Sorbitan mono-oleate | 1.0 |
| Sodium acetate hydrate | 25.0 |
| Magnesium sulphate | 0.575 |
| Manganese sulphate | 0.120 |
| Ferrous sulphate | 0.034 |
| Total (dry) | 69.709 |

This was then converted into a broth by the addition of 70 parts to a liter of water, adding an organic acid, such as citric, lactic, or acetic, to give a pH of 5.8, after which the broth was brought to the boiling temperature and subsequently cooled. We prefer to use acetic acid in obtaining the pH of 5.8. This medium (broth) will be referred to herein as the growth medium (GM).

Just why these particular species of lactic acid bacteria grow so luxuriantly in the above broth at pH 5.8 is not known. Typical media (broths) used in the industry for the isolation and growth of lactic acid bacilli have a pH ranging from about 6.1 to 7.2. It certainly was unexpected that changing the pH of the plating medium from 5.4 to 5.6±0.05 would reverse the inhibitory effect of the selective isolation medium (SIM). Further, it certainly was unexpected that luxuriant growth could be obtained in a broth having a pH of 5.8 when conventional broths in industry range from about 6.1 to about 7.2.

As an illustrative example of the method of our invention, experiments were conducted comparing cell yields from the growth medium (GM) having a pH of 5.8 which was prepared from the individual ingredients, brought to a boiling temperature and subsequently cooled, with the yields from a broth having the following composition: Trypticase, 1%; yeast extract, 1%; dextrose, 1%; dipotassium phosphate, 0.5%; and a pH of 6.8–7.0. This product is known herein as (TYE).

TABLE I.—CELL YIELDS OF VARIOUS SPECIES OF LACTIC ACID BACTERIA GROWN IN GM AND TYE BROTH

| Organism | Strain | No. of g. (dry wt.) of cells per liter | | No. of cells per ml. ×10⁻³ | |
|---|---|---|---|---|---|
| | | GM | TYE | GM | TYE |
| Pediococcus cerevisiae | FBB-39 | 2.5 | 0.4 | 1,523 | 112 |
| Lactobacillus plantarum | FBB-12 | 2.8 | 0.4 | 1,850 | 273 |
| L. brevis | FBB-70 | 1.4 | 0.3 | 194 | 58 |
| L. fermenti | NRRL B-585 | 1.3 | 0.3 | 300 | 110 |
| L. delbrueckii | {NRRL B-443 | 0.8 | 0.3 | 130 | |
| | {NRRL B-445 | 4.3 | 1.0 | 3,580 | 670 |
| L. thermophilus | NRRL B-1952 | 1.5 | 0.5 | 60 | 23 |
| L. lactis | NRRL B-736 | 1.5 | 0.8 | 960 | 300 |
| G. helveticus | NRRL B-1842 | 1.3 | 0.5 | 100 | |
| L. bulgaricus | NRRL B-734 | 1.0 | 0.5 | 200 | 40 |
| Leuconostoc mesenteroides | FBB B-41 | 1.0 | 0.3 | 705 | 340 |

Tubes containing 10 ml. of each medium were inoculated from stock cultures of the bacteria grown in TSA stabs, incubated 18 to 24 hours at the optimum temperature for the species used (32 or 45° C.), and the entire culture used to inoculate 190 ml. of the respective media. Cell yields were determined after 24 and 48 hours incubation. Plate counts were determined using (SIM) medium, and total cell counts by use of a Petroff-Hausser counting chamber. For dry weight yields, cells were centrifuged from 200 ml. of culture; the pellet resuspended in a small volume of water, and transferred to a tared bottle, dried at 110° C. for 48 hours, and weighed.

A summary of typical results is given in Table I. Cell yields after 24 and 48 hr. incubation were comparable, so only the 48 hr. data are presented. The growth medium (GM) produced higher cell yields than the TYE broth with all species tested. However, its most pronounced effect was observed with *P. cerevisiae, L. plantarum,* and certain strains of *L. delbrueckii,* the cell yields of these species in LBS broth were 4 to 6 times higher than in TYE. However, four of seven strains of *L. delbrueckii* tested grew poorly in both media.

The plate count data are not presented since they correspond closely with the total cell counts. There was no rapid loss in cell viability in any of these cultures within 48 hr. resulting from the growth medium (GM) broth.

The (GM) broth is easily prepared, and does not have to be sterilized, only brought to a boiling temperature. Plating studies demonstrated that some microbial groups other than lactic acid bacteria (e.g., coliforn bacteria) will grow in LBS agar when the pH is raised above that specified herein. However, when lactic acid bacteria are inoculated into the broth medium (GM), the initial pH (5.8) is rapidly lowered by acid development to a level that precludes development of endospores or incidental contaminants. No contamination of any of the cultures produced in the (GM) medium has been observed. However, there are undoubtedly bacterial endospores present in the boiled medium so the method would not be suitable for producing cell preparations wherein these residual spores would constitute a problem.

Resting cells of *L. plantarum* harvested from the (GM) cultures fermented glucose to lactic acid rapidly.

The luxuriant growth of these lactobacilli made possible the production of cells in sufficient quantities to determine the desirability of genera, species, or strains of species, for the inoculation of brine stock in the development of pure culture fermentation processes for vegetables such as cucumber pickles. From the standpoint of desirability, the order follows:

*L. plantarum*
*P. cerevisiae*
*L. delbrueckii*
*L. lactis*
*L. thermophilus,* and
*Leuconostoc mesenteroides.*

It will be noted that a strain of *L. delbrueckii* produced the most cells during the growth period, with *L. plantarum* second, and *P. cerevisiae* third.

We claim:

1. A process for selectively isolating and growing desirable lactic acid producing bacteria from naturally-occurring complex mixtures of micro-organisms on plant materials and useful in the commercial production of brined vegetables, which process comprises the following steps:

(a) preparing a selective isolation medium consisting of:

| | Parts |
|---|---|
| Trypticase | 10 |
| Yeast | 5 |
| Monopotassium phosphate | 6 |
| Ammonium citrate | 2 |
| Dextrose | 20 |
| Sorbitan mono-oleate | 1 |
| Sodium acetate hydrate | 25 |
| Magnesium sulphate | 0.575 |
| Manganese sulphate | 0.120 |
| Ferrous sulphate | 0.034 |
| Agar | 15 |
| Distilled water | 916 | parts being by weight, after which sufficient organic acid selected from the group consisting of acetic acid, citric acid, and lactic acid is added to give a pH of $5.6 \pm 0.05$;

(b) heating the selective medium to the boil;
(c) maintaining a period of dwell at the boiling point for at least two minutes;
(d) cooling the selective medium to about 40° C.;
(e) inoculating the selective medium with the complex mixture of micro-organisms;
(f) incubating the inoculated medium for about 48 to 96 hours at a temperature of 32° C. for mesophilic and 48° C. for thermophilic species.
(g) transferring colonies of the desired micro-organisms from the selective isolation medium to a Trypticase-Sugar-Agar stab to develop a stock culture;
(h) preparing a growth medium consisting of:

| | Parts |
|---|---|
| Trypticase | 10 |
| Yeast extract | 5 |
| Monopotassium phosphate | 6 |
| Ammonium citrate | 2 |
| Dextrose | 20 |
| Sorbitan mono-oleate | 1 |
| Sodium acetate hydrate | 25 |
| Magnesium sulphate | 0.575 |
| Manganese sulphate | 0.120 |
| Ferrous sulphate | 0.034 |
| Water | 930 | parts being by weight, after which sufficient organic acid selected from the group consisting of acetic acid, citric acid, and lactic acid is added to give a pH of 5.8;

(i) heating the growth medium to the boil;
(j) cooling the growth medium to about 32° C. for mesophilic and 48° C. for thermophilic species.
(k) transferring the stock culture to the growth medium wherein luxuriant and rapid growth of the desirable micro-organisms occur; and
(l) recovering the desirable pure-culture lactic acid producing bacteria useful in the commercial production of brined vegetables.

2. A medium for selectively isolating certain lactic acid producing bacteria useful in the commercial production of brined vegetables from naturally-occurring complex mixtures of micro-organisms, which medium is prepared according to the following sequential operations:

(a) dissolving in 916 parts by weight of distilled water the following ingredients:

| | Parts |
|---|---|
| Trypticase | 10 |
| Yeast | 5 |
| Monopotassium phosphate | 6 |
| Ammonium citrate | 2 |
| Dextrose | 20 |
| Sorbitan mono-oleate | 1 |
| Sodium acetate hydrate | 25 |
| Magnesium sulphate | 0.575 |
| Manganese sulphate | 0.120 |
| Ferrous sulphate | 0.034 |
| Agar | 15 | the ingredient parts being by weight, and thereafter adding thereto sufficient organic acid selected from the group consisting of acetic acid, citric acid, and lactic acid to yield a solution of pH $5.6 \pm 0.05$;

(b) heating the resulting solution to the boil;
(c) maintaining a period of dwell at the boiling point for at least two minutes; and
(d) cooling the solution to about 40° C.

3. A medium for selectively growing certain lactic acid producing bacteria useful in the commercial production of brined vegetables from naturally-occurring complex mixtures of micro-organisms, which medium is prepared according to the following sequential operations:

(a) dissolving in 930 parts by weight of distilled water the following ingredients:

| | Parts |
|---|---|
| Trypticase | 10 |
| Yeast extract | 5 |
| Monopotassium phosphate | 6 |
| Ammonium citrate | 2 |
| Dextrose | 20 |
| Sorbitan mono-oleate | 1 |
| Sodium acetate hydrate | 25 |
| Magnesium sulphate | 0.575 |
| Manganese sulphate | 0.120 |
| Ferrous sulphate | 0.034 | the ingredient parts being by weight, and thereafter adding thereto sufficient organic acid selected from the group consisting of acetic acid, citric acid, and lactic acid to yield a solution of pH 5.8;

(b) heating the resulting solution to the boil; and
(c) cooling the solution to about 32° C. for mesophilic and 48° C. for thermophilic species.

4. A process according to claim 1 wherein the desirable lactic acid bacteria are pure cultures selected from the group consisting of *Lactobacillus plantarum, Pediococcus cerevisiae, Lactobacillus delbrueckii, L. lactis, L. thermophilus,* and *leuconostoc mesenteroides.*

5. A process according to claim 1 wherein the desirable pure cultures of lactic acid bacteria are recovered in one of the forms selected from the group consisting of broth, dried pellets, dried granules, and dried powder.

References Cited

Rogosa et al.: J. Bacteriology, vol. 62, pp. 132 and 133, 1951.

ALVIN E. TANENHOLTZ, *Primary Examiner.*